(12) United States Patent
Mies

(10) Patent No.: US 6,568,884 B2
(45) Date of Patent: May 27, 2003

(54) CUTTER HEAD ADJUSTMENT DEVICE

(75) Inventor: Georg Mies, Wipperfürth (DE)

(73) Assignee: Klingelnberg Sohne GmbH, Huckeswagen (DE)

( * ) Notice: Subject to any disclaimer, the term of this patent is extended or adjusted under 35 U.S.C. 154(b) by 0 days.

(21) Appl. No.: 09/930,193

(22) Filed: Aug. 16, 2001

(65) Prior Publication Data

US 2002/0020256 A1 Feb. 21, 2002

(30) Foreign Application Priority Data

Aug. 16, 2000 (DE) .................................... 200 14 122 U
Nov. 23, 2000 (DE) .................................... 200 19 937 U

(51) Int. Cl.$^7$ .............................. B23E 1/00; B23B 1/00; G01B 5/00
(52) U.S. Cl. .................................. 409/1; 82/47; 33/549; 33/628
(58) Field of Search .......................... 33/549, 551, 626, 33/628, 633, 634, 635, 639, 641; 29/407.01, 33 R; 409/131, 133, 186, 157, 193, 194

(56) References Cited

U.S. PATENT DOCUMENTS

| | | | |
|---|---|---|---|
| 2,533,024 A | * 12/1950 | Lustrik | 33/639 |
| 4,879,817 A | * 11/1989 | McMurtry | 33/502 |
| 5,035,554 A | * 7/1991 | Nickols | 409/131 |
| 5,035,556 A | * 7/1991 | Lamotte et al. | 409/218 |
| 5,839,943 A | 11/1998 | Stadtfeld | |
| 6,082,016 A | * 7/2000 | Otani et al. | 33/642 |
| 6,216,335 B1 | * 4/2001 | Freyermuth | 29/701 |

FOREIGN PATENT DOCUMENTS

| | | |
|---|---|---|
| JP | 10277889 | 10/1998 |
| WO | 9707930 | 3/1997 |

* cited by examiner

*Primary Examiner*—A. L. Wellington
*Assistant Examiner*—Brian Walsh
(74) *Attorney, Agent, or Firm*—Antonelli, Terry, Stout & Kraus, LLP

(57) ABSTRACT

A device aids the setter of a cutter head for cutting, e.g., milling or hobbing, of spiral bevel gears to align all rod-shaped blades with their tip cutting edges to an axial height which is as uniform as possible and to move them with their profile cutting edges to a correct radial position in the cutter head so that uniform chip removal can take place. The device has a stable arm which can be moved numerically controlled axially and radially to the cutter head, with positions which are continuously measured and with which each individual blade can be automatically pushed into its chamber in the cutter head. A probe which is connected to the arm measures the axial height of the tip cutting edge of each blade before, during and shortly after each blade is pushed in. An evaluation computer determines from the measurements of the probe and the simultaneously measured positions of the arm the value of the height of the tip cutting edge relative to the end face of the cutter head which is considered as a reference.

11 Claims, 4 Drawing Sheets

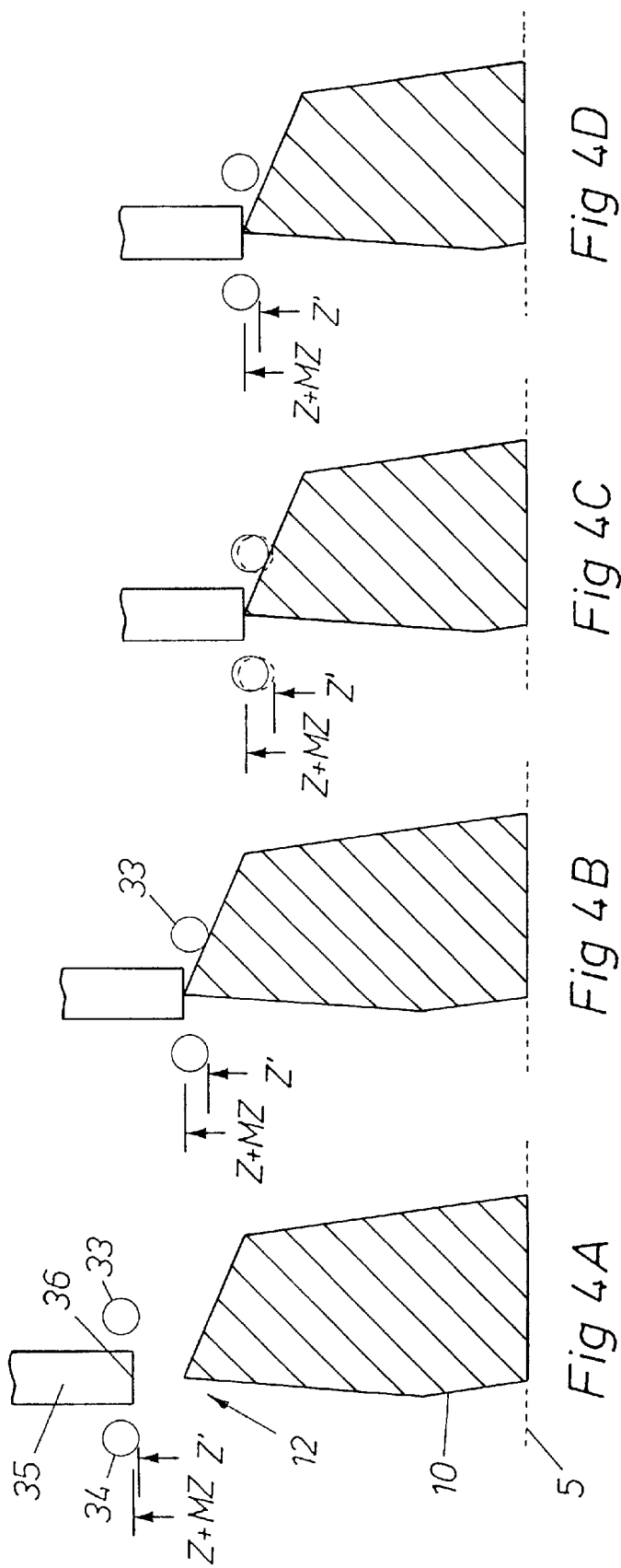

CUTTER HEAD ADJUSTMENT DEVICE

BACKGROUND OF THE INVENTION

The invention relates to a device for adjusting stick-type blades in a cutter head, e.g., of the type used for milling or hobbing of spiral bevel gears.

These devices help the setter of a cutter head in aligning all blades with their tip cutting edges to an axial height which is as uniform as possible and at the same time in moving them with their profile cutting edges to a correct radial position in the cutter head. On the one hand, this should result in that the tip cutting edges in plunge cutting of tooth gaps remove chips of the same thickness and do not wear the individual projecting blades to an excess degree. On the other hand, in the generating process, all profile cutting edges will execute uniform profiling cuts so that a correct tooth profile is produced.

This adjustment process is necessary not only when the cutter head is first equipped with new blades, but also after each resharpening of the blades. Specifically, all blades must be dismounted from their chambers in the cutter head for sharpening, resharpened, and then re-installed exactly. Nevertheless, this tool system is economically advantageous since the stick blades can be resharpened many times only when the adjustment process is prompt, reliable and accurate. Therefore adjustment devices are used for support.

A device of this type is described for example in WO 97/07930. Accordingly, it was prior art that the blades were inserted by hand into the chambers of the cutter head, pushed with their tip cutting edges in the axial direction against a stop, and preferably clamped with pressing screws in their chambers. On this basis, the invention of WO 97/07930 relates essentially to the process for acquiring the radial position of each blade, the probe which is provided being located in a measurement plane which is offset from the axial plane of the cutter head. Sensing takes place therefore almost vertically on the lateral relieved surface of each blade. If it is ascertained that the radial position of the individual blade is outside the stipulated tolerance, these blades must be briefly released in the conventional manner in the cutter head, their tip cutting edges pressed by hand against the now correspondingly corrected stop, and screwed tight again.

The described manual displacement of the blades against the fixed stop consisting mostly of hard metal has the major defect that damage can easily occur on the tip cutting edges: On the one hand, when the cutter encounters the stop at an overly high speed, on the other, when the cutter is moved somewhat radially by screwing tight and/or is pressed axially with the tip cutting edge against the fixed stop. Damage can occur especially when the cutters themselves also consist of hard metal and their tip cutting edges are accordingly more sensitive.

SUMMARY OF THE INVENTION

The present invention can reliably prevent damage to the tip cutting edges when the blade is adjusted and in doing so nevertheless within a short time to achieve the required tolerance for the location of the blades in the cutter head. The cutter head may be one which is used for cutting, e.g., hobbing or milling of spiral bevel gears, each cutter or blade, e.g., stick-type blade, having a shaft, a tip cutting edge and at least one profile cutting edge. The cutter head includes a disk-shaped base or tool body with an axis of rotation, two parallel end faces, and a plurality of chambers which are located around the periphery and into which the respectively assigned blade with its shaft is pushed and releasably fixed. The device for adjusting such blades includes a frame, a numerically controlled turntable provided on the frame for coaxially supporting the cutter head, and a stable arm attached to the frame, the stable arm being movable at least axially and radially to the cutter head supported on the turntable and being numerically controlled and having, on its front end, a push head with which each blade can be pushed automatically into its chamber down to a stipulated height. At least one measuring device is provided for measuring positions of the push head relative to the frame. A probe is connected to the stable arm, the probe having at least one deflectable feeler which can be deflected perpendicular to one end face of the cutter head, the deflectable feeler having a sensing surface located in an immediate vicinity of the push head. The probe measures before, during and shortly after a blade is pushed in, positions of the tip cutting edge relative to the push head. An evaluation means is provided for evaluating the measured values of the measuring device and the probe to determine the attained height of the tip cutting edge of each blade relative to an end face of the disk-shaped tool body.

One main advantage of the device of the present invention is that it can automatically push the inserted cutters or blades into the stipulated axial position in the cutter head and in doing so works much more uniformly and accurately than is possible in manual setting. In particular, damage to the tip cutting edges is precluded by the push head with its pressure surface made as claimed in the invention coming down on the blade behind the tip cutting edge with a stipulated noncritical speed, while the sensitive tip cutting edge is touched only by the sensing surface of the probe which exerts a low measurement force of roughly 0.2 N. With the received measurement values not only is the insertion of the blades controlled, but also their final position in the cutter head is measured.

If, in one embodiment of the device, the turntable has a vertical axis of rotation, in the supported cutter head its chambers are also roughly vertical. This leads to the blades which have be inserted for adjustment being able to slip too far down. In this case it is provided that all blades are exposed to a friction force which is preferably applied by narrow leaf springs. They are all located in turn preferably on a thin disk which is matched to the size of the cutter head and which is seated on the cutter head before assembly so that one leaf spring projects into each chamber. If at this point the blades are inserted into the chambers, they are held by the leaf springs and nevertheless can be pushed down by the arm as claimed in the invention against a roughly constant friction.

A similar advantageous action is attained when instead of the narrow leaf springs in each chamber there is a coiled compression spring which is attached coaxially to that side of the existing pressing screw which presses against the blade and holds it. This embodiment of the invention has the additional advantage that each blade can also be exposed to the correct force when it is to take an altered radial location in the cutter head using a spacer plate in its chamber.

If in another embodiment of the invention a multicoordinate probe is used, a feeler combination with two feelers can be applied. While one is used as claimed in the invention to sense the tip cuffing edges in the axial direction, after clamping the blades in the cutter head, the other feeler can measure the location of the profile cutting edges in the radial direction. If this measurement shows that individual blades exceed the tolerance for the radial cuffing edge position, the device as claimed in the invention offers potential for simple correction of the cuffing edge position which will be detailed later.

In another embodiment of the invention the device is integrated in a conventional, numerically controlled multi-coordinate measurement device which either already has a turntable or is retrofitted with one. In addition, on such a measurement device there is a carriage which carries the probe and which can be moved axially and radially to the turntable. When this carriage also acquires an arm with a push head, as claimed in the invention, all structural prerequisites for an adjustment device as claimed in the invention are met. Then the CNC control of the measurement device is provided with a software expansion and on the probe a corresponding feeler for axial measurement of the tip cutting edges is inserted in order to obtain a serviceable device as claimed in the invention.

BRIEF DESCRIPTION OF THE DRAWINGS

Embodiments of the invention are detailed below with reference to the drawings.

FIGS. 4A–4D show four coherent detailed representations of a push head before, during and shortly after the blade is pushed in;

DETAILED DESCRIPTION OF THE PREFERRED EMBODIMENTS

Figure 1:
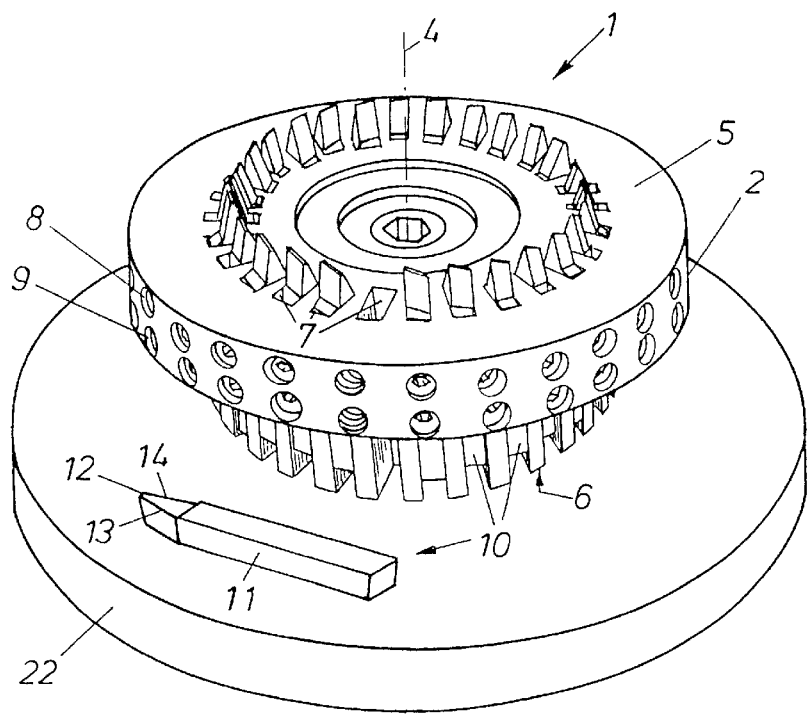
FIG. 1 shows a perspective view of a cutter head with rod-shaped cutters or blades.

The cutter head 1 is shown in FIG. 1 coaxially supported on the turntable 22 of an adjustment device. The cutter head 1 includes a disk-shaped base or tool body 2 with one axis 4 of rotation and two parallel end faces 5 and 6. On the periphery of the cutter head 1 is a plurality of chambers 7 which must be very exactly manufactured in their dimensions. Rod-shaped cutters or blades 10, e.g., stick-type blades, are inserted into these chambers 7 and are clamped tight with pressing screws 8 and 9. Each of these blades 10 consists of a shaft 11, a tip cutting edge 12, a profile cutting edge 13 and a secondary cutting edge 14 which is not intended for cutting when this cutter head is used on a gear cutting machine.

So that the cutter head can cut, e.g., hob or mill precise bevel gears, all profile cutting edges 13 of the inserted blades 10 must have the correct radial distance from the axis 4 of rotation. For two reasons this cannot be achieved without an adjustment process for each blade 10.

On the one hand, it is an advantageous property of this tool system that the blades in their axial height are freely adjustable in order to be able to equalize different resharpening states of the blades. On the other hand, the individual production tolerances of each chamber, of the shaft used and of the cuffing edges relative to the respective shaft add up to a value which is often outside of the allowable radial position tolerance. Therefore, these production tolerances must be equalized when the blades are being adjusted. To do this the radial position of the profile cutting edge can be influenced via the axial height of the blades, it being less a mailer of the absolute radial dimension in the cutter head than of the location of the profile cutting edges among one another differing by only a few microns.

Figure 2:
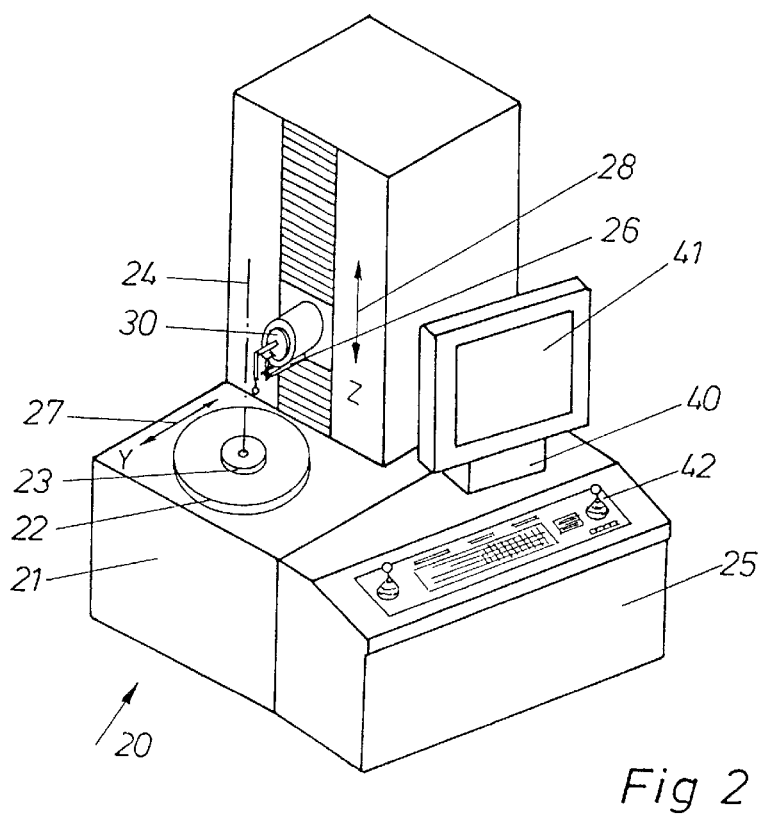
FIG. 2 shows an overall schematic view of the device as claimed in the invention.

This accuracy can be achieved with a device 20 as shown in FIG. 2. On the frame 21 is a turntable 22 which using a numerical control 25 can be turned into definable angular positions around the axis 24. The turntable 22 is provided with a cone 23 with which for example the cutter head 1 is held coaxially in the same way as on the tool spindle of a bevel gear cutting machine.

On the frame 21 there is furthermore mounted an equipment base which is not detailed with a compound slide with which the arm 26 can be moved in a conventional manner by computer numerical control (CNC) in the Y and Z direction; this corresponds to the radial direction 27 and the axial direction 28 relative to the turntable 22. The arm 26 is provided with a probe 30 which thus executes the same movements as the arm 26. The fragile probe 30 is protected by a tubular sleeve 31 which at the same time imparts the necessary bending stiffness to the arm 26 (this is shown more clearly in FIG. 3). A conventional numerically controlled, multicoordinate measurement device can be provided for measuring the position of the probe 30 and arm 26.

Furthermore, FIG. 2 shows the evaluation means 40 with a display monitor 41. The panel 42 of the device 20 as claimed in the invention is located above the control 25.

Figure 3:
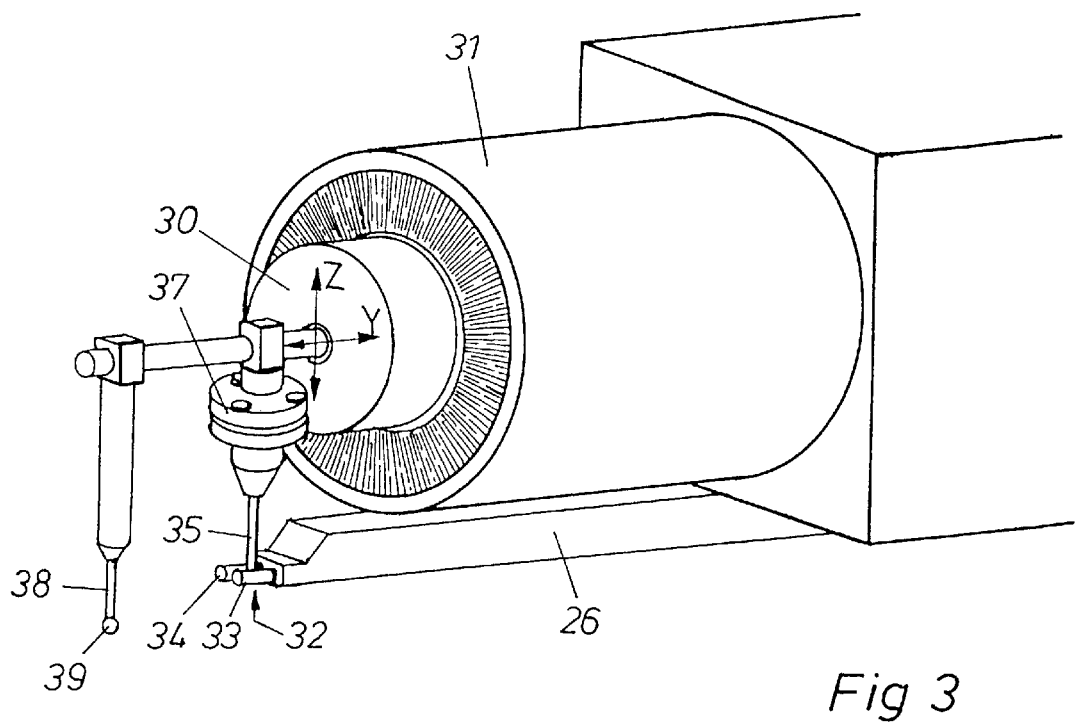
FIG. 3 shows a perspective view of an arm as claimed in the invention in conjunction with a probe.

FIG. 3 shows the arm 26 in conjunction with the probe 30. On the front end of the arm is a push head 32 which in this case consists of two parallel cylindrical pins 33 and 34. The feeler 35, which is designed for axial measurement of the tip cutting edges 12, ends between these two pins. The required flat sensing surface 36 on the bottom end of the feeler 35 is aligned with three screws of a calibration device 37 with which the feeler 35 is attached to the probe 30. Since the probe 30 can be deflected in two directions, specifically Y and Z, which are given in FIG. 3 by two arrows, on the probe 30 there is a combination of the feeler 35 and another feeler 38 which is designed with its sensing ball 39 for radial measurement of the profile cutting edges 13.

FIGS. 4A–4D show four positions of a blade 10 which is being pushed into the chamber of a cutter head which is not completely shown; but, as a common reference only, its upper face surface 5 is indicated as a broken line. Before pushing them in, all the blades of the cutter head 1 have been inserted manually into their chambers 7 and moved to roughly the same height. In another preparation step, using the panel 42 the arm 26 with its push head 32 is positioned over the first blade, this initial position as position A for all other cutters is sent to the storage of the numerical control 25 and then the automatic adjustment process is started.

In the position shown in FIG. 4A, the push head 32, represented schematically by the two cylindrical pins 33 and 34, together with the feeler 35, is located above the blade 10, the probe 30 recording the value MZ=0 as the deflection of its feeler 35. The measurement means for the Z position of the arm 26 is calibrated such that the read Z value corresponds to the distance of the flat sensing surface 36 from the end face 5. The lower end face 6 of the cutter head which coincides with the mounting surface of the cutter head in the cutting machine may also be chosen as a reference. This would have the advantage that in series production no differences in the heights of the cutter heads in use have to be considered by the machine control. The height Z' of the lower part of the pins 33 and 34 is irrelevant as long as it is in the vicinity of the flat sensing surface 36. It must in any case be aligned exactly parallel to the end face 6.

In the position shown in FIG. 4B, the arm 26 with the push head 32 has been lowered slowly to the unknown position of the blade 10, first the sensing surface 36 touching the tip cuffing edge 12 and starting to deflect the feeler 35. At this instant the control 25 determines the instantaneous axial height of the tip cutting edge 12 from the read Z value of the measurement means plus the simultaneously recorded deflection MZ of the probe 30. At the same time, the arm 26 continues to move down slowly until one of the two pins 33 or 34 rests on the blade 10, in this case the pin 33. For another cutter head with the opposite direction of cuffing the pin 34 would be used. The contact of the pin is recognized by the control 25 from the fact that the deflection MZ of the probe 30 no longer increases. At this instant the arm 26 remains stationary for a short time, the deflection MZ1 is stored and the numerical control 25 computes the defining points for the further path over which the blade 10 must now be pushed until the stipulated height of the tip cutting edge is reached. If, as in this case, the chambers 7 do not run parallel to the axis 4 of rotation, but are tilted in the peripheral direction, the push head 32 must move exactly in the direction of the chambers 7 in order not to offset relative to the blade 10 during insertion. It then follows from the computed points that the arm 26 must move not only in the Z direction, but also in the Y direction, and at the same time the turntable 22 must turn the cutter head 1 simultaneously, as corresponds to the tilt angle of the chambers 7.

In the position shown in FIG. 4C, the tip cutting edge 12 of the blade 10 should have reached the stipulated height. There the arm 26 has pushed the blade 10 first with a continuous speed and then the last segment which corresponds to the stored MZ1 value at a slow speed. In doing so the control 25 has recorded the last deflection MZ2 of the feeler. Since the insertion of the blade 10 is not possible without small deformations in a device 20 as claimed in the invention, the position of FIG. 4C also shows the location of the pins 33 and 34 by broken lines when the device is not loaded in a somewhat exaggerated representation. It follows that the blade 10 has not yet entirely reached its stipulated height.

FIG. 4D therefore shows the push head 32 shortly after lifting from the blade 10, when the control 25 recognizes that the deflection MZ of the feeler 35 has been reduced relative to MZ2 and stops the unloaded arm 26. Now the attained axial height of the tip cuffing edge 12 can be determined accurately, as in the position shown in FIG. 4B. The control 25 computes therefrom the still lacking amount of the difference relative to the stipulated height, slowly lowers the arm 26 again until the deflection MZ2 of the feeler 35 which was recorded last is reached and then pushes the blade 10 again by the measured amount of difference.

When the push head 32 is lifted, the finally attained height of the tip culling edge 12 is now recorded and then the arm 26 is moved into the stored initial position of FIG. 4A, while the turntable 22 turns the next blade 10 to under the push head 32 and the adjustment process can be automatically repeated. If all blades of the cutter head 1 are moved to the same axial height, they are tightened with the pressing screws 8 and 9. Then, with the device 20 as claimed in the invention the radial position of the profile cutting edges 13 can be automatically measured using the feeler 38. If in doing so it is ascertained by the evaluation device 40 that the individual single blades exceed the tolerance, they are indicated to the tool seller on the monitor 41. For small deviations one can create equalization by specifically changing the tightening moment of the pertinent screws 8 and 9. Using the feeler 38, the radially altered cutting edge position is directly monitored. If this measure should not be sufficient, after the screws 8 and 9 are loosened once more, automatic pushing of the pertinent blades 10 again can be started. To do this, the control 25 computes an axial correction value from the amount by which the tolerance is radially exceeded and by using the corresponding angle of the profile cutting edge 13 and then, with consideration of the respectively stored value MZ2, resets this blade in the same way as was done for equalization of the load-induced deformations.

Figure 5:
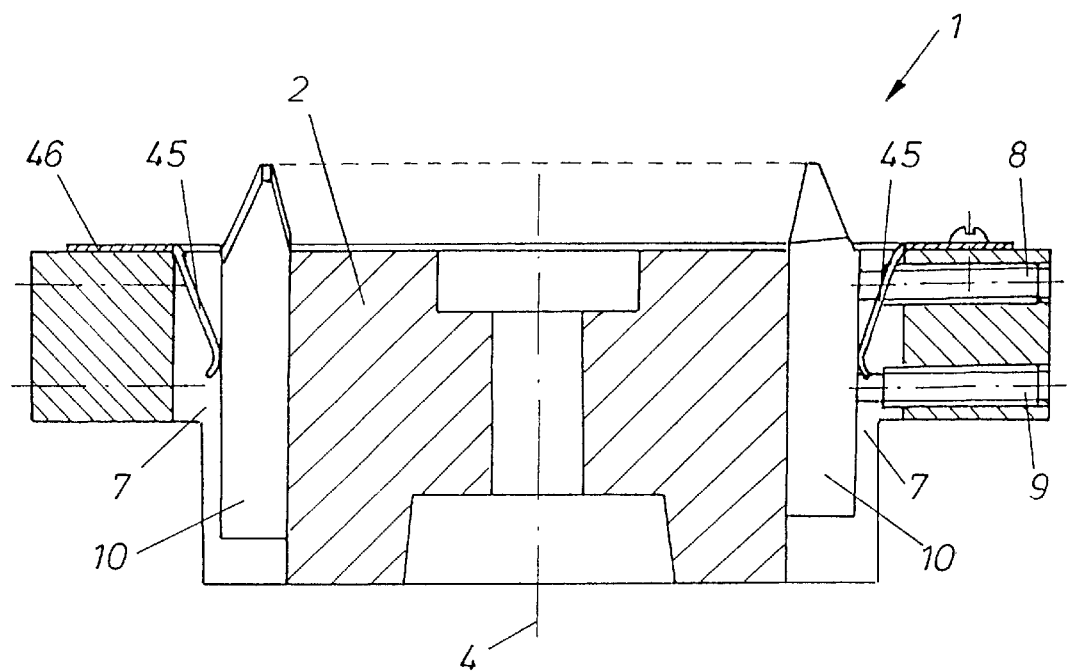
FIG. 5 shows a section through a cutter head with leaf springs as claimed in the invention.

This section of the cutter head shown in FIG. 5 is placed through the tool body 2 such that two roughly opposite chambers are visibly open. Inside there is the respective blade 10 which is held by a narrow leaf spring 45 until all blades are aligned by the arm 26 in order to clamp each individual blade 10 past the narrow leaf springs 45 with the screws 8 and 9. Then, the disk 46 to which preferably all leaf springs 45 are attached and from which they project into the chambers 7 can be removed.

Figure 6:
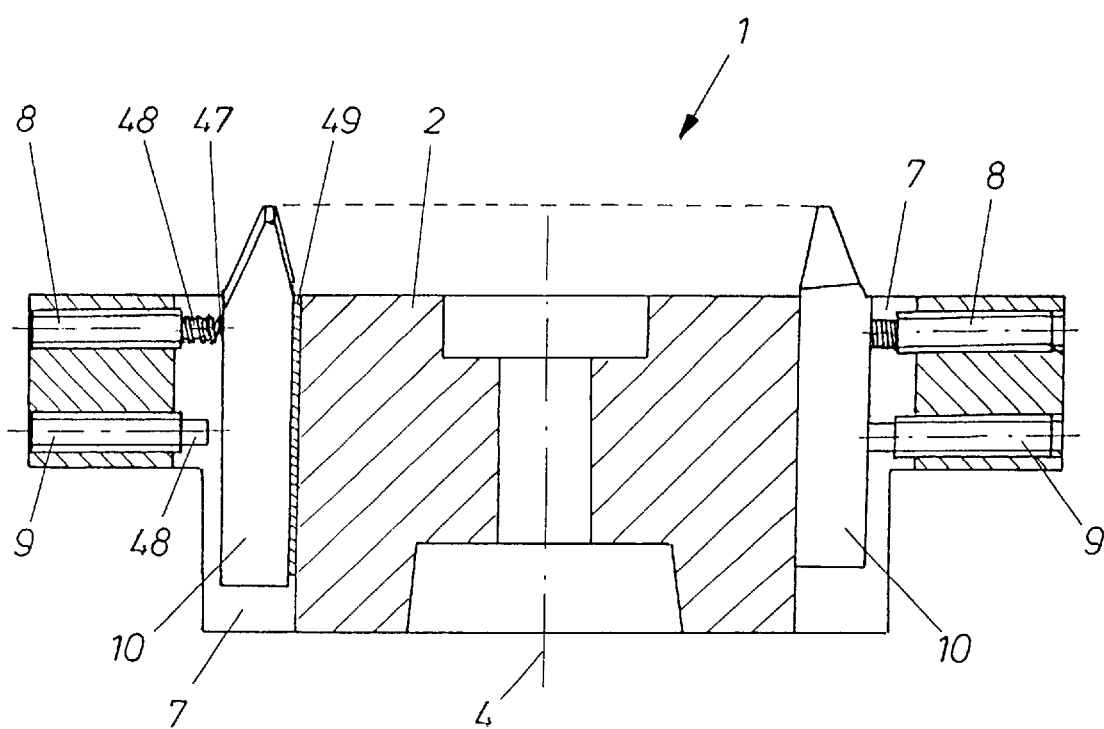
FIG. 6 shows a section through a cutter head with compression springs as claimed in the invention.

FIG. 6 shows a section of the cutter head 1 similar to FIG. 5. In this case each individual blade 10 is movably held in its chamber 7 not by a narrow leaf spring, but by a coiled compression spring 47. For this purpose the extension 48 of the pressing screw 8 which presses against the blade 10 when clamping has been somewhat lengthened. Thus the compression spring 47 can be pushed coaxially over the extension 48 and attached there. The other end of the compression spring 47 projects at first somewhat beyond the extension 48 so that when the pressing screw 8 is screwed in, then the spring 47 is compressed and produces the desired retaining force on the blade 10 (shown in FIG. 6, left). In this case, it is irrelevant what radial position the blade 10 is to take in the cutter head 1, whether with or without a spacer plate 49. Only when the blade 10 is aligned with the device 20, the pressing screw 8 is tightened further until its extension 48 clamps the blade in its chamber 7 (shown in FIG. 6, right).

What is claimed is:

1. Device for adjusting blades in a cutter head which is used for cutting of spiral bevel gears, each blade having a shaft, a tip cutting edge and at least one profile cutting edge; the cutter head comprising a disk-shaped tool body with an axis of rotation, two parallel end faces, and a plurality of chambers which are located around the periphery and into which a respectively assigned blade with its shaft is pushed and releasably fixed, the device comprising:

a frame;

a numerically controlled turntable provided on the frame for coaxially supporting the cutter head;

a stable arm attached to the frame, the stable arm being movable at least axially and radially to the cutter head supported on the turntable and being numerically controlled and having, on its front end, a push head with which each blade can be pushed automatically into its chamber down to a stipulated height;

at least one measuring device for continuously measuring positions of the push head relative to the frame;

a probe connected to the stable arm, the probe having at least one deflectable feeler which can be deflected perpendicular to one end face of the cutter head, the deflectable feeler having a sensing surface located in an immediate vicinity of the push head, the probe measuring before, during and shortly after a blade is pushed in, positions of the tip cutting edge relative to the push head; and an evaluation means for evaluating the measured values of the measuring device and the probe to determine the attained height of the tip cutting edge of each blade relative to an end face of the disk-shaped tool body.

2. Device as claimed in claim 1, wherein the push head consists of an annular surface which runs parallel to one end face of the cutter head and which surrounds the feeler.

3. Device as claimed in claim 1, wherein the push head has two cylindrical pins which run parallel to one another and to one end face of the cutter head and between which the feeler projects.

4. Device as claimed in claim 1, wherein each blade in the cutter head can be exposed to a force which keeps the blade on the one hand in its chamber, on the other hand allows the displacement by the push head of the arm against a roughly constant friction.

5. Device as claimed in claim 4, wherein the force for each individual blade is applied by a narrow leaf spring which projects into the chamber of the blade.

6. Device as claimed in claim 4, wherein the force for each individual blade is applied by a compression spring which is provided on that side of a pressing screw with which the blade is clamped after adjustment.

7. Device as claimed in claim 1, wherein the sensing surface of the feeler is flat and can be aligned with a calibration device parallel to one end face of the cutter head.

8. Device as claimed in claim 1, wherein the probe is designed for measurement in several coordinate directions and carries a feeler combination with at least two separate sensing surfaces and, of which one is intended for sensing the tip cutting edges in the axial direction and the other for sensing the profile cutting edges in the radial direction relative to the cutter head.

9. Device as claimed in claim 1, wherein the at least one measuring device is a numerically controlled multicoordinate measurement device.

10. A combination of a cutter head and a device for adjusting blades therein, comprising:

a plurality of blades, each blade having a shaft, a tip cutting edge and at least one profile cutting edge;

a cutter head comprising of a disk-shaped tool body with an axis of rotation, two parallel end faces, and a plurality of chambers which are located around the periphery and into which a respectively assigned blade with its shaft is pushed and releasably fixed;

a frame;

a numerically controlled turntable provided on the frame for coaxially supporting the cutter head;

a stable arm attached to the frame, the stable arm being movable at least axially and radially to the cutter head supported on the turntable and being numerically controlled and having, on its front end, a push head with which each blade can be pushed automatically into its chamber down to a stipulated height;

at least one measuring device for continuously measuring positions of the push head relative to the frame;

a probe connected to the stable arm, the probe having at least one deflectable feeler which can be deflected perpendicular to one end face of the cutter head, the deflectable feeler having a sensing surface located in an immediate vicinity of the push head, the probe measuring before, during and shortly after a blade is pushed in, positions of the tip cutting edge relative to the push head; and an evaluation means for evaluating the measured values of the measuring device and the probe to determine the attained height of the tip cutting edge of each cutter relative to an end face of the disk-shaped tool body.

11. A method for adjusting blades in a cutter head which is used for cutting of spiral bevel gears, each blade having a shaft, a tip cutting edge and at least one profile cutting edge; and the cutter head comprising a disk-shaped tool body with an axis of rotation, two parallel end faces, and a plurality of chambers which are located around the periphery and into which a respectively assigned blade with its shaft is pushed and releasably fixed, the method comprising:

moving a stable arm at least axially and radially to the cutter head under numerical control, the stable arm being attached to a frame and having, on its front end, a push head;

pushing each blade with the push head into its chamber down to a stipulated height;

continuously measuring positions of the push head relative to the frame;

measuring before, during and shortly after a blade is pushed in, positions of the tip cutting edge relative to the push head with a probe connected to the stable arm, the probe having at least one deflectable feeler which can be deflected perpendicular to one end face of the cutter head, the deflectable feeler having a sensing surface located in an immediate vicinity of the push head for measuring positions of the tip cutting edge relative to the push head; and evaluating the measured values of the positions of the push head relative to the frame and of the probe to determine the height of the tip cutting edge of each blade relative to an end face of the disk-shaped tool body.

* * * * *